US012612822B1

(12) United States Patent
Murray

(10) Patent No.: US 12,612,822 B1
(45) Date of Patent: Apr. 28, 2026

(54) ADJUSTABLE SCREEN HOOD ASSEMBLY FOR SLOPED ROOF STRUCTURES

(71) Applicant: Michael Murray, Jacksonville, FL (US)

(72) Inventor: Michael Murray, Jacksonville, FL (US)

(*) Notice: Subject to any disclaimer, the term of this patent is extended or adjusted under 35 U.S.C. 154(b) by 128 days.

(21) Appl. No.: 18/616,482

(22) Filed: Mar. 26, 2024

Related U.S. Application Data

(63) Continuation-in-part of application No. 29/934,054, filed on Mar. 22, 2024, now Pat. No. Des. 1,075,482.

(51) Int. Cl.
*E06B 9/42* (2006.01)

(52) U.S. Cl.
CPC .................................... *E06B 9/42* (2013.01)

(58) Field of Classification Search
CPC ... E06B 9/32; E06B 9/266; E06B 9/50; E06B 9/323; E06B 9/56; E06B 2009/587; E06B 9/58; E06B 9/581; E06B 9/17; A47H 1/12; A47H 1/22; A47H 1/124; E04F 10/10; E04F 10/08
See application file for complete search history.

(56) References Cited

U.S. PATENT DOCUMENTS

| | | | | |
|---|---|---|---|---|
| 5,505,418 | A * | 4/1996 | Corcoran | E06B 9/323 248/257 |
| 6,196,508 | B1 * | 3/2001 | Nijs | A47H 1/13 248/267 |
| 6,902,141 | B2 * | 6/2005 | Kirby | E06B 9/50 248/266 |
| 7,451,956 | B2 * | 11/2008 | Bohlen | E06B 9/323 248/265 |
| 7,836,937 | B2 * | 11/2010 | Anderson | E06B 9/34 160/242 |
| 7,854,419 | B2 * | 12/2010 | Ng | E06B 9/50 248/257 |
| 8,967,568 | B2 * | 3/2015 | Wills | E06B 9/50 248/269 |
| 9,206,641 | B2 * | 12/2015 | Feldstein | A47H 1/12 |
| 10,214,960 | B2 * | 2/2019 | Ng | E06B 9/50 |
| 10,612,301 | B2 * | 4/2020 | Derk, Jr. | E06B 9/88 |
| 10,704,324 | B2 * | 7/2020 | Goldberg | E06B 9/50 |
| 10,968,695 | B2 * | 4/2021 | Chen | E06B 9/50 |

(Continued)

*Primary Examiner* — Beth A Stephan
(74) *Attorney, Agent, or Firm* — Ashkan Najafi

(57) ABSTRACT

An adjustable screen hood assembly includes a screen hood housing, a reel-mounting bracket having a first vertical length and disposed within the screen hood housing, a screen hood bracket removably affixed to an end of the screen hood housing wherein the one screen hood bracket has a central aperture provided with a second vertical length greater than the first vertical length. The reel-mounting bracket is adjustably positioned within a perimeter of the central aperture and displaced along a bi-directional vertical travel path registered orthogonal (or substantially orthogonal) to a longitudinal length of the screen hood housing. The screen hood housing has a longitudinal axis angularly offset relative to a horizontal axis. The screen hood housing is configured to be continuously abutted against the existing sloped beam and oriented parallel thereto such that no gap exists between the underside of the existing sloped beam and the screen hood housing.

20 Claims, 7 Drawing Sheets

(56) References Cited

U.S. PATENT DOCUMENTS

| | | | | |
|---|---|---|---|---|
| 11,965,380 | B2 * | 4/2024 | Enochs | E06B 9/50 |
| 12,185,859 | B2 * | 1/2025 | Quatraro | A47H 1/144 |
| D1,075,482 | S * | 5/2025 | Murray | D14/224 |
| 2005/0183835 | A1 * | 8/2005 | Nien | E06B 9/50<br>160/321 |
| 2009/0152422 | A1 * | 6/2009 | Ng | E06B 9/50<br>248/265 |
| 2015/0034260 | A1 * | 2/2015 | Blair | E06B 9/50<br>160/310 |
| 2016/0340972 | A1 * | 11/2016 | Chou | E06B 9/68 |
| 2017/0211315 | A1 * | 7/2017 | Fleischman | E06B 9/13 |
| 2019/0024452 | A1 * | 1/2019 | Derk, Jr. | E06B 9/42 |
| 2020/0157882 | A1 * | 5/2020 | Chen | E06B 9/42 |
| 2020/0300034 | A1 * | 9/2020 | Hopkins | E06B 9/42 |
| 2021/0230938 | A1 * | 7/2021 | Hall | E06B 9/32 |
| 2022/0025699 | A1 * | 1/2022 | Barioli | F16F 1/16 |
| 2022/0195797 | A1 * | 6/2022 | Garcia Garcia | E06B 9/58 |
| 2023/0104031 | A1 * | 4/2023 | Wang | E06B 9/56<br>160/238 |
| 2023/0142806 | A1 * | 5/2023 | Greening | E06B 9/32<br>248/200 |
| 2023/0167677 | A1 * | 6/2023 | Benotto | E06B 9/17<br>160/23.1 |
| 2023/0235622 | A1 * | 7/2023 | Hashimoto | E04B 9/001<br>160/31 |
| 2024/0368938 | A1 * | 11/2024 | Li | E06B 9/72 |

* cited by examiner

ADJUSTABLE SCREEN HOOD ASSEMBLY FOR SLOPED ROOF STRUCTURES

CROSS REFERENCE TO RELATED APPLICATIONS

This is a continuation-in-part application claiming the benefit of and priority to currently pending U.S. patent application Ser. No. 29/934,054 filed on Mar. 22, 2024 and incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to pergola hood assemblies and, more particularly, to an adjustable screen hood assembly including a screen hood bracket configured to horizontally position a reel-mounting bracket inside a non-horizontal screen hood assembly housing that is oriented parallel to and abutted against a non-horizontal support beam of a sloped roof structure, thereby eliminating a gap between the non-horizontal screen hood assembly housing and the non-horizontal support beam while enabling the screen reel to work in a proper horizontal (level) manner.

Prior Art

Screens are often mounted to the bottom side of a sloped roof beam such as a pergola roof beam or a sloped patio perimeter roof beam. Such sloped beams are often not horizontally level so the roof (e.g., pergola roof, patio roof, etc.) maintains a slope to drain fluid and debris away therefrom. For pergolas, the sloped roof is achieved by shortening a longitudinal length of at least one vertical support column of the pergola structure. Unfortunately, such a shorter vertical support column creates a gap between a screen hood housing and the sloped pergola beam. Such gaps also exist in a variety of other sloped roof structures such as sloped patio structures, for example.

Typically, a screen hood housing must be installed level (horizontal) because the reel (spool) about which the screen is rolled within the screen hood housing has fixed attachment points within the screen hood housing. A non-horizontal screen hood housing will cause the screen to roll up or down unevenly and incorrectly. When installing a screen hood housing that is level with an unlevel (not horizontal) sloped beam, a gradually increasing gap exists between the top of the screen hood housing and the underside of the sloped beam. This gap is unsightly, and customers generally request the gap to be filled, which is a difficult and expensive process and is not always possible.

As an example, a sloped pergola roof slopes 0.5 inches every 12 feet, such that a 24-foot-wide pergola roof has a one-inch slope. With the screen hood housing installed level (horizontal) under the sloped pergola beam, a one-inch gap is visible on the right side of the pergola.

Accordingly, a need remains for an adjustable screen hood assembly to overcome at least one aforementioned shortcoming. The exemplary embodiment(s) satisfy such a need by providing an adjustable screen hood assembly including a screen hood bracket that is convenient and easy to use, lightweight yet durable in design, versatile in its applications, and configured to horizontally position a reel-mounting bracket inside a non-horizontal screen hood assembly housing that is oriented parallel to and abutted against a non-horizontal support beam of a sloped roof structure, thereby eliminating a gap between the non-horizontal screen hood assembly housing and the non-horizontal support beam while enabling the screen reel to work in a proper horizontal (level) manner.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an adjustable screen hood assembly including a screen hood bracket configured to horizontally position a reel-mounting bracket inside a non-horizontal screen hood assembly housing that is oriented parallel to and abutted against a non-horizontal support beam of a sloped roof structure, thereby eliminating a gap between the non-horizontal screen hood assembly housing and the non-horizontal support beam while enabling the screen reel to work in a proper horizontal (level) manner. These and other objects, features, and advantages of the non-limiting exemplary embodiment(s) are provided by an adjustable screen hood assembly for reducing a gap along a sloped roof structure. Such an adjustable screen hood assembly includes a screen hood housing configured to be statically affixed to an underside of an existing sloped beam of a sloped roof, at least one reel-mounting bracket having a first vertical length and being disposed within the screen hood housing, at least one screen hood bracket removably affixed to an associated end of the screen hood housing wherein the at least one screen hood bracket has a central aperture provided with a second vertical length greater than the first vertical length, and a gasket disposed within the screen hood housing and being engaged with the at least one screen hood bracket. Advantageously, the at least one reel-mounting bracket is adjustably positioned within a perimeter of the central aperture and selectively displaced along a bi-directional vertical travel path registered orthogonal (or substantially orthogonal) to a longitudinal length of the screen hood housing. Advantageously, the screen hood housing has a central longitudinal axis angularly offset relative to a horizontal axis. Advantageously, the screen hood housing is configured to be continuously abutted against the existing sloped beam and oriented parallel thereto such that no gap exists between the underside of the existing sloped beam and the screen hood housing.

In a non-limiting exemplary embodiment, the at least one screen hood bracket includes a central portion surrounding the central aperture and having a single and continuous layer provided with a planar posterior face and a planar anterior face opposed therefrom.

In a non-limiting exemplary embodiment, the at least one screen hood bracket further includes a plurality of flanges integral and monolithic with the single and continuous layer.

In a non-limiting exemplary embodiment, the flanges include a first flange being extended upwardly from a top edge of the single and continuous layer and being planar thereto.

In a non-limiting exemplary embodiment, the flanges further include a second flange being extended forwardly from a bottom edge of the anterior face and further being registered orthogonal thereto.

In a non-limiting exemplary embodiment, the flanges further include a third flange being extended forwardly from a left edge of the anterior face and further being registered orthogonal thereto.

In a non-limiting exemplary embodiment, the flanges further include a fourth flange being extended forwardly from a right edge of the anterior face and further being registered orthogonal thereto; wherein the third flange is oriented parallel to the fourth flange.

In a non-limiting exemplary embodiment, the bi-directional travel path is shorter than the first vertical length of the central aperture and oriented parallel to a vertical axis.

In a non-limiting exemplary embodiment, at least one edge of the reel-mounting bracket is spaced from the perimeter of the central aperture.

There has thus been outlined, rather broadly, the more important features of non-limiting exemplary embodiment (s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 19:
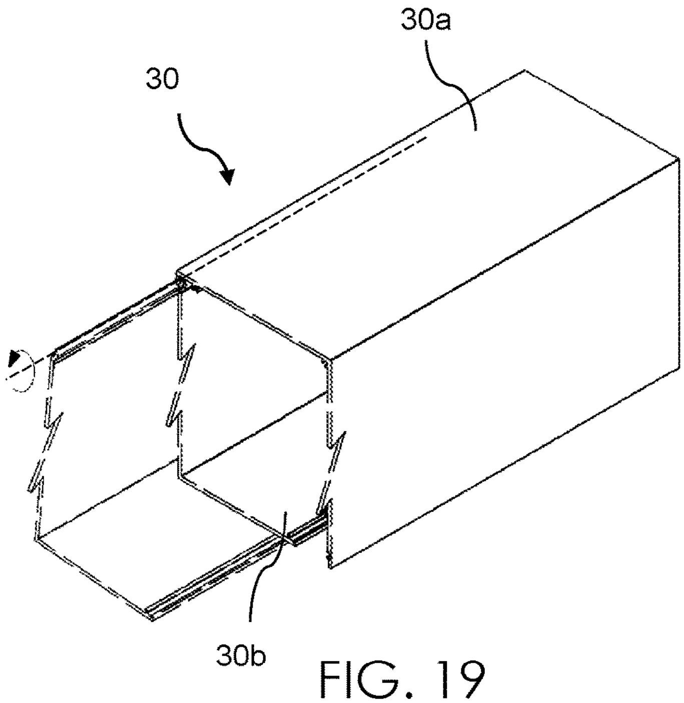
Figure 18A:
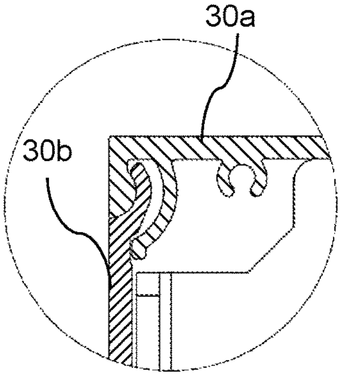
FIG. 18A is an enlarged view of section 18A taken in FIG. 18.
Figure 20:
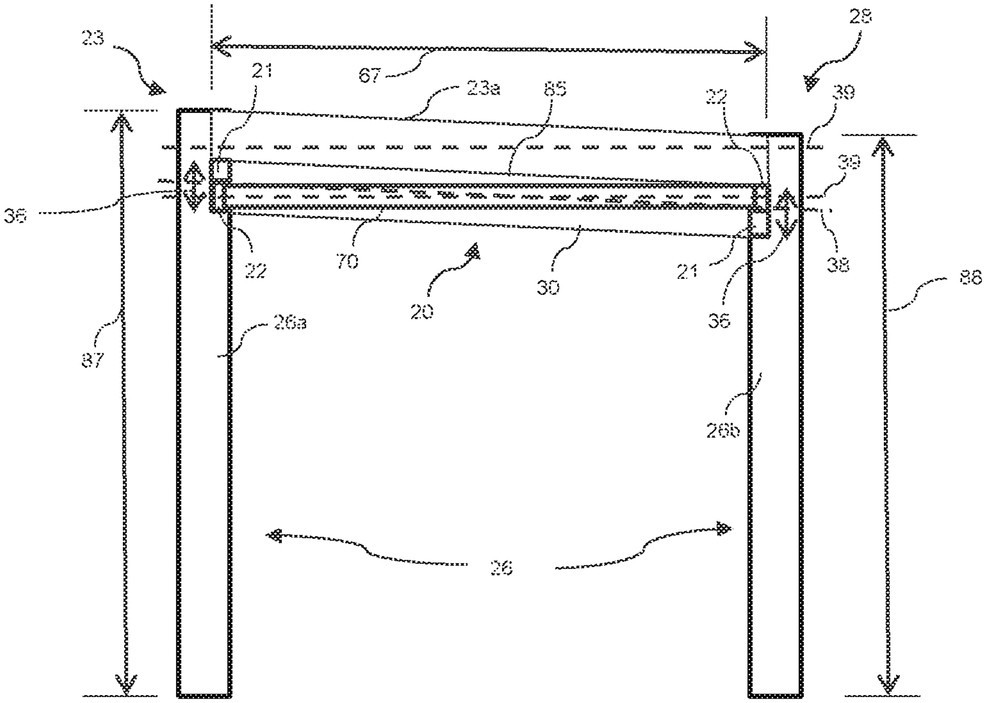

FIG. 19 is a perspective view showing a pivotal movement of an access panel relative to a base of adjustable screen hood assembly housing; and FIG. 20 is a schematic diagram illustrating the horizontal alignment of the reel-mounting brackets and associated screen reel inside the non-horizontal sloped screen hood assembly housing continuously abutted to an underside of the non-horizontal sloped beam and oriented parallel thereto so that no gap exists therebetween.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational and are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The broken lines shown in the figures are intended to show a truncated view of the subject matter because the entire lengths thereof do not fit on a single sheet of paper.

The terms "screen hood housing" and "screen hood assembly housing" are interchangeably used throughout the present disclosure.

The non-limiting exemplary embodiment(s) is/are referred to generally in FIGS. 1-20 and is/are intended to provide an adjustable screen hood assembly 20 including a screen hood bracket 21 configured to horizontally position a reel-mounting bracket 22 inside a non-horizontal screen hood assembly housing 30 oriented parallel to and abutted against a non-horizontal support beam 23 of a sloped roof structure 28 and thereby eliminate any gap between the non-horizontal screen hood assembly housing 30 and the non-horizontal support beam 23 while enabling the screen reel 70 to work in a proper horizontal (level) manner. Such a structural configuration yields the new, useful, and unpredicted result of significantly reducing (and preferably eliminating) any gap between a screen hood assembly housing 30 and a sloped beam 23 of a sloped roof structure 28.

In a non-limiting exemplary embodiment, the adjustable screen hood bracket 21 provides extra space therein for vertical adjustment (along bi-directional travel path 86) of a reel-mounting bracket 22 and the overall screen hood assembly 20. The adjustable screen hood bracket 21 is located inside the hood assembly housing 30. The adjustable screen hood bracket 21 has a central aperture 35 in the center thereof, which serves as a guide to receive the reel-mounting bracket 22 at opposed ends of the hood assembly housing 30. Within the guide (center aperture interior perimeter 35*a*), the reel-mounting bracket 22 is easily moved up and down (along bi-directional travel path 86) within the hood assembly housing 30 to find a horizontal level and then is secured in place with fasteners. The reel-mounting bracket 22 can be positioned high or low within the adjustable hood bracket aperture 35, as perhaps best shown in FIGS. 2 and 3. The ability to adjust the reel-mounting brackets 22 within the hood mounting bracket aperture 35 allows a screen hood assembly housing 30 to be installed tightly to an out of level (non-horizontal) sloped roof beam 23 (e.g., sloped pergola and patio roof structures 28) and then horizontally leveled within the hood assembly housing 30 by adjusting the position of the reel-mounting bracket 22 within the opening perimeter 35*a* of the adjustable hood bracket 21. Such a structural configuration yields the new, useful, and unpredicted result of significantly reducing (and preferably eliminating) a gap 29 between a screen hood assembly housing 30 and a sloped beam 23 of a sloped roof structure 28.

In a non-limiting exemplary embodiment, a gasket 37 may be employed to help minimize noise from transmitting into the aluminum columns 26 (26*a-c*) of the sloped structure roof beam 23.

In a non-limiting exemplary embodiment, housing 30 has a base 30*a* and an access panel 30*b* pivotally coupled thereto.

In a non-limiting exemplary embodiment, an optional generic side track/screen receiver 95 may be provided. It is not mandatory. The side track/screen receiver 95 is not a critical component of the hood and bracket assembly 20. For example, a shade screen can be made that has no side track but would still use a hood housing 30 and a reel 70 so the screen can roll up and the hood housing 30 could be out of level (non-horizontal) and there would still be a need to level the reel 70 using screen hood bracket 21 for the screen to roll up evenly.

Figure 1:
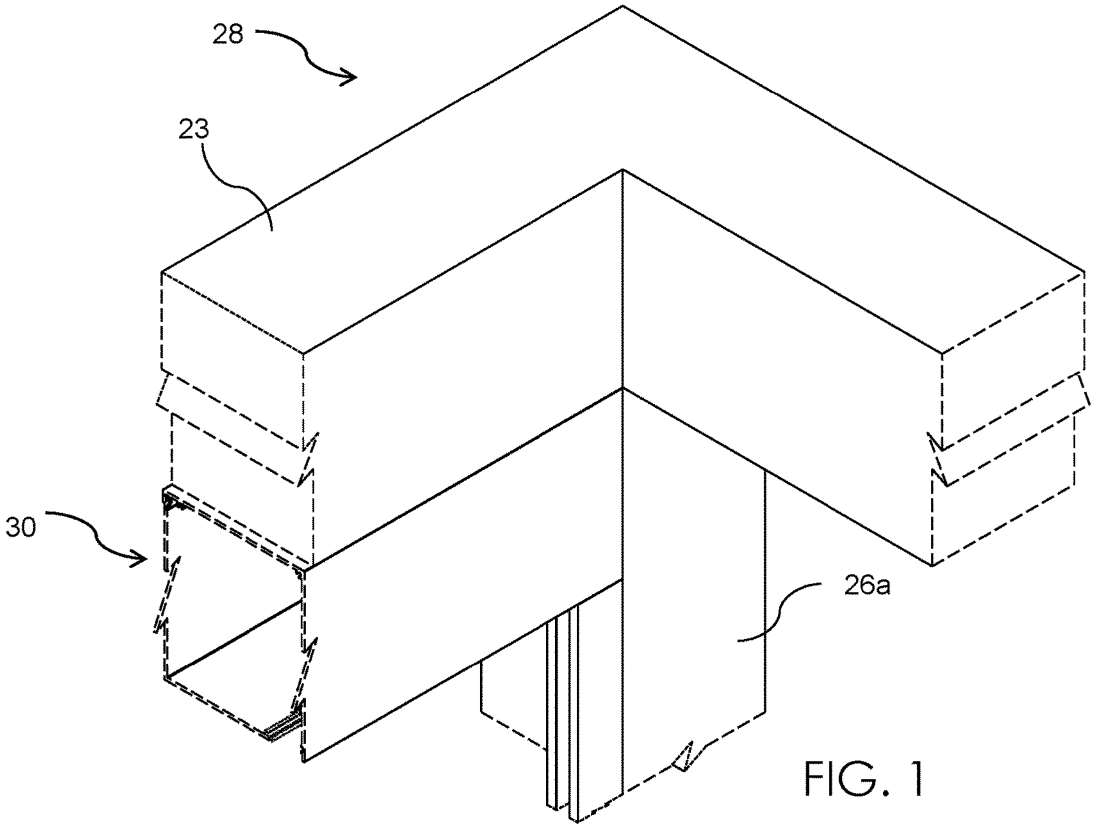
FIG. 1 is a partial perspective view showing one end of an adjustable screen hood assembly positioned relative to a sloped pergola beam and column, in accordance with a non-limiting exemplary embodiment of the present disclosure.
Figure 2:
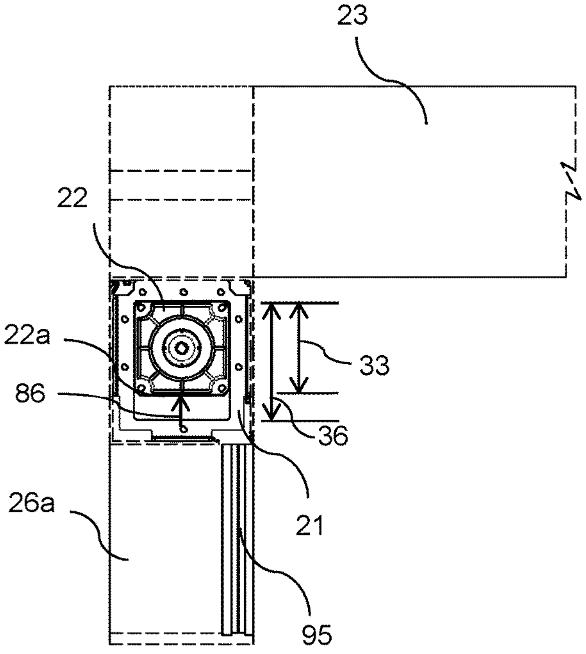
FIG. 2 is a left side elevational view of the adjustable screen hood assembly shown in FIG. 1 wherein the reel-mounting bracket is disposed at a top position within an opening of the screen hood bracket.
Figure 3:
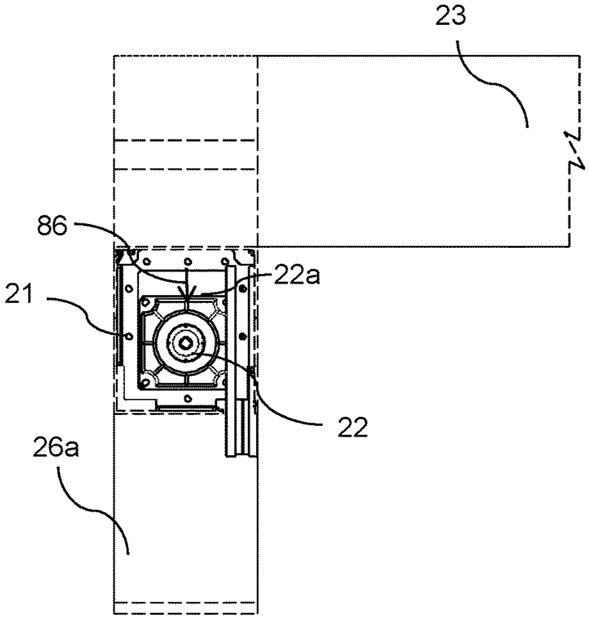
FIG. 3 is another left side elevational view of the adjustable screen hood assembly shown in FIG. 1 wherein the reel-mounting bracket is disposed at a bottom position within an opening of the screen hood bracket.
Figure 4:
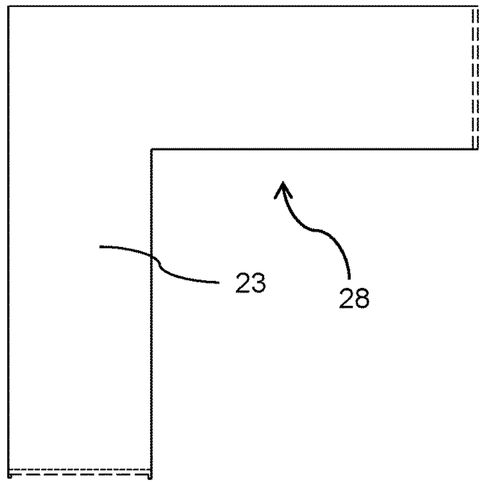
FIG. 4 is a top plan view of the adjustable screen hood assembly shown in FIG. 1.
Figure 5:
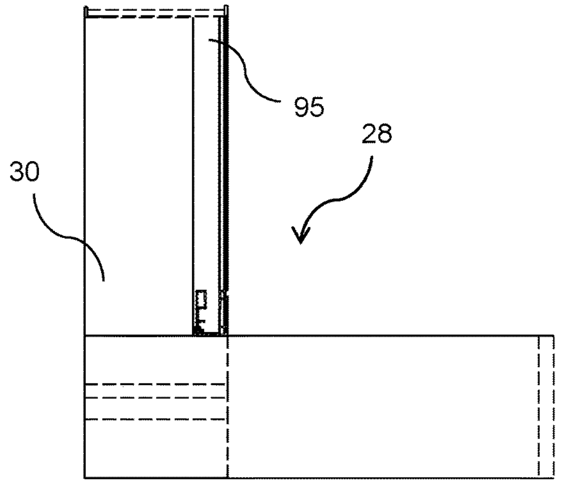
FIG. 5 is a bottom plan view of the adjustable screen hood assembly shown in FIG. 1.
Figure 6:
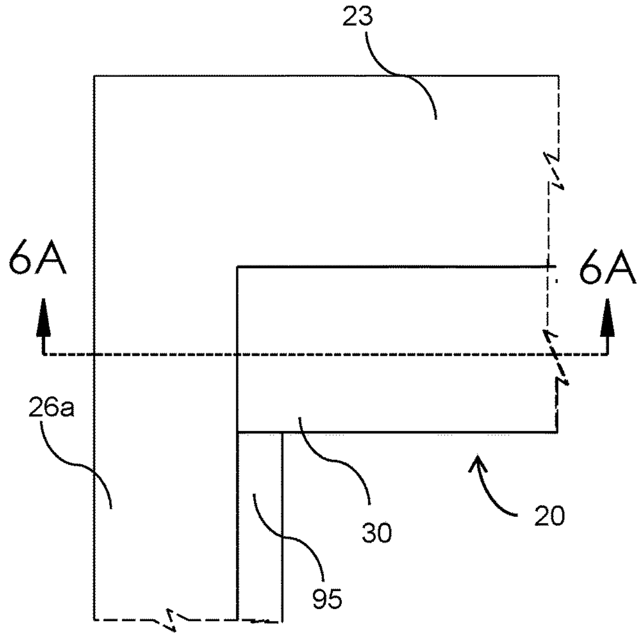
FIG. 6 is a left side elevational view of the adjustable screen hood assembly shown in FIG. 1.
Figure 6A:
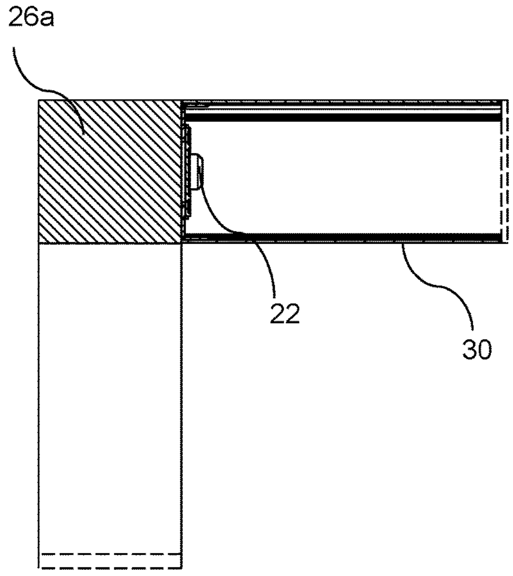
FIG. 6A is a cross-sectional view taken along line 6A-6A in FIG. 6.
Figure 7:
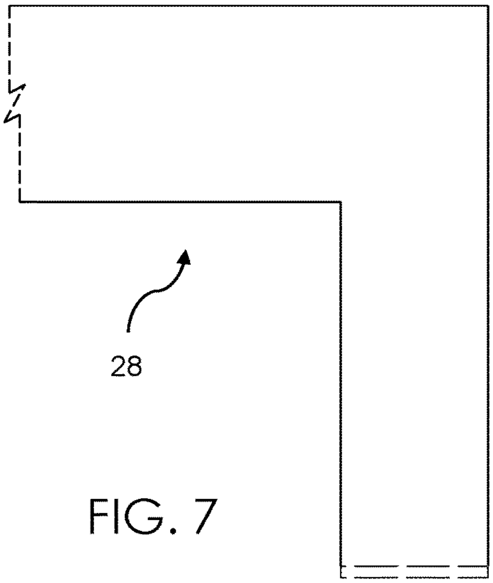
FIG. 7 is a right side elevational view of the adjustable screen hood assembly shown in FIG. 1.
Figure 8:
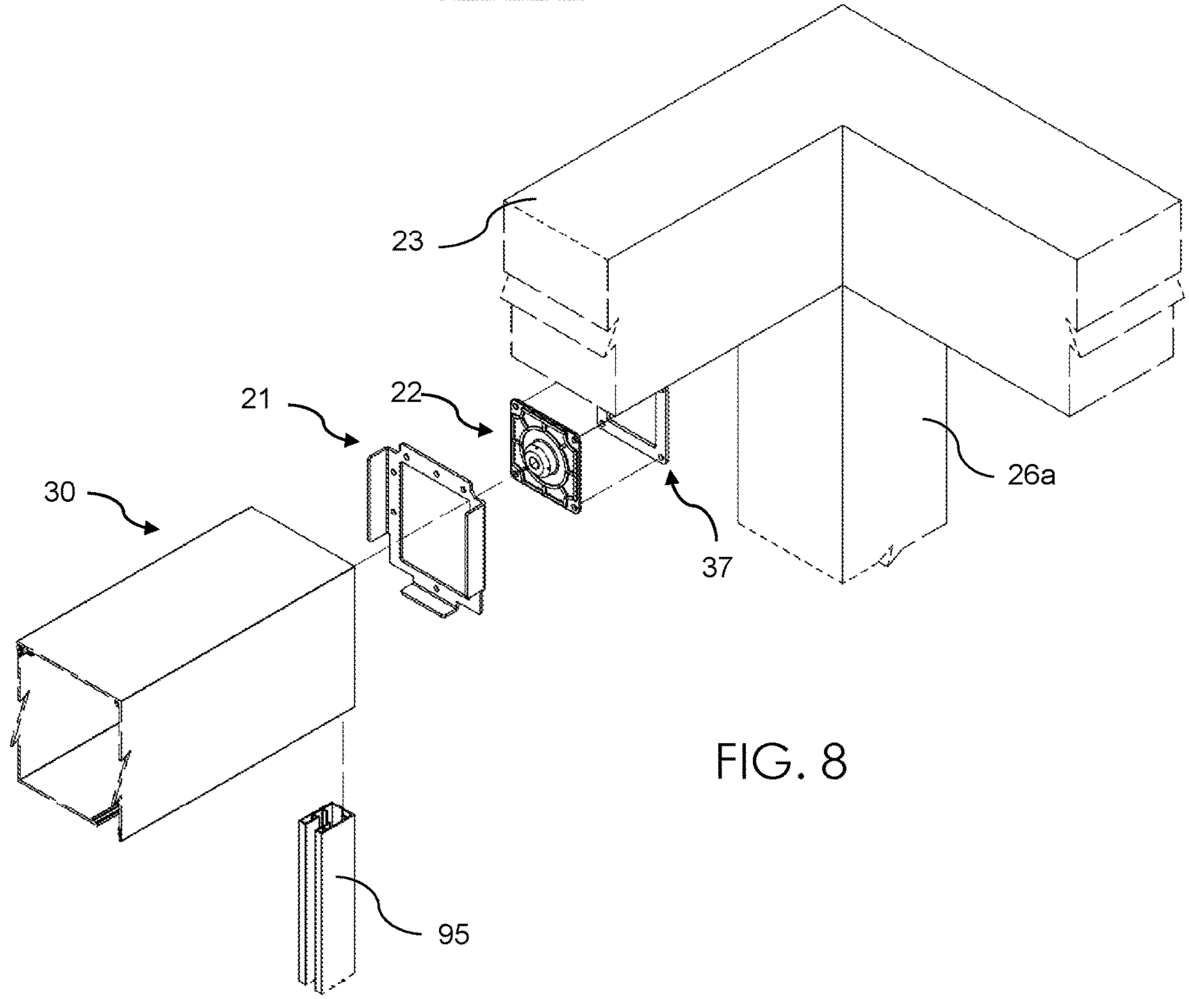
FIG. 8 is an exploded view of the adjustable screen hood assembly shown in FIG. 1.
Figure 9:
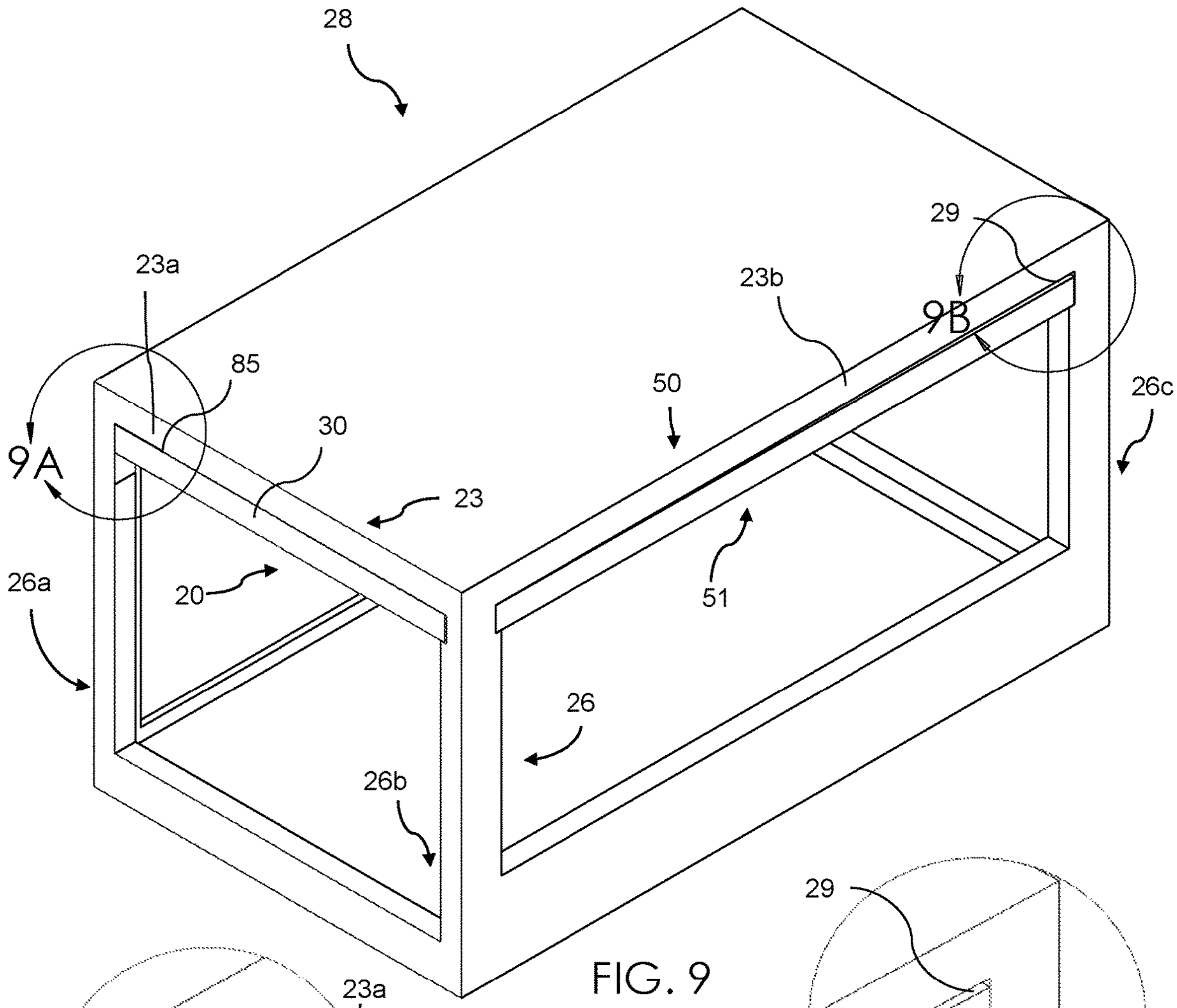
FIG. 9 is an environmental perspective view of a slope roof structure (left sloped beam of a pergola frame): (1) employing the adjustable screen hood assembly at a left side thereof (no gap exists therebetween), and (2) employing a conventional screen hood assembly on a right side thereof (gap exists therebetween)
Figure 9A:
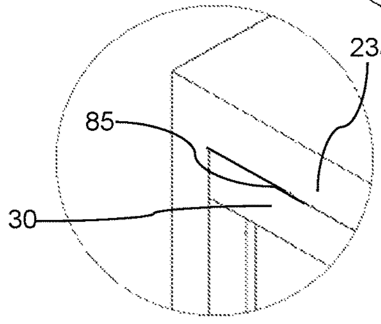
FIG. 9A is an enlarged perspective view of section 9A taken in FIG. 9, wherein no gap exists because the screen hood bracket is employed.
Figure 9B:
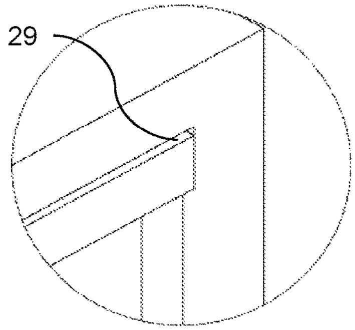
FIG. 9B is an enlarged perspective view of section 9B taken in FIG. 9, wherein a gap exists because the screen hood bracket is not employed.
Figure 10:
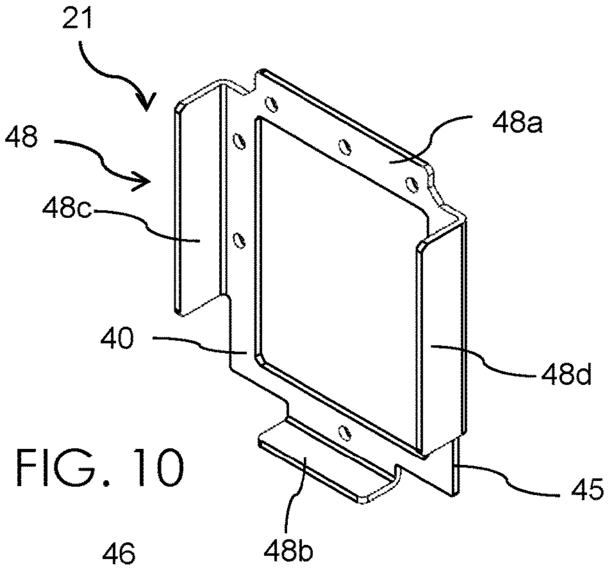
FIG. 10 is a perspective view of the screen hood bracket.
Figure 11:
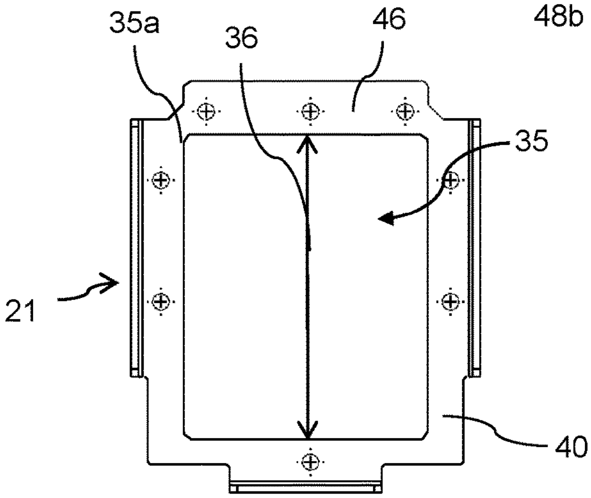
FIG. 11 is a front elevational view of the screen hood bracket.
Figure 12:
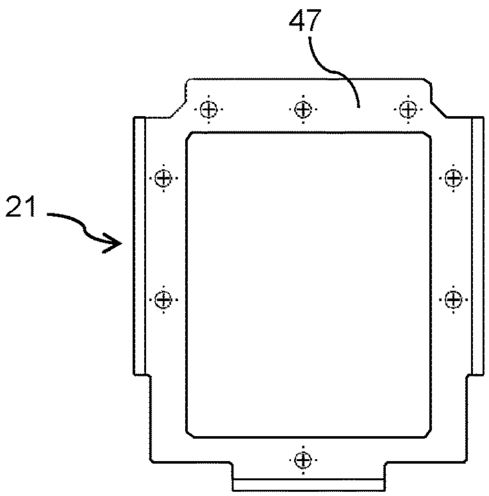
FIG. 12 is a rear elevational view of the screen hood bracket.
Figure 13:
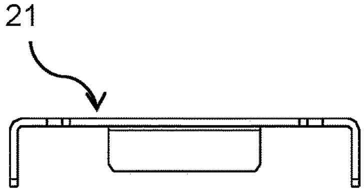
FIG. 13 is a top plan view of the screen hood bracket.
Figure 14:
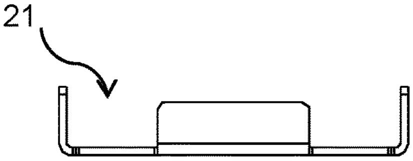
FIG. 14 is a bottom plan view of the screen hood bracket.
Figure 15:
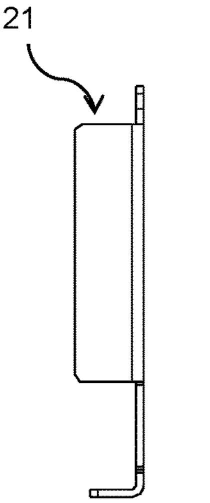
FIG. 15 is a left side elevational view of the screen hood bracket.
Figure 16:
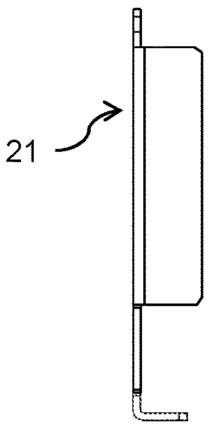
FIG. 16 is right side elevational view of the screen hood bracket.
Figure 17:
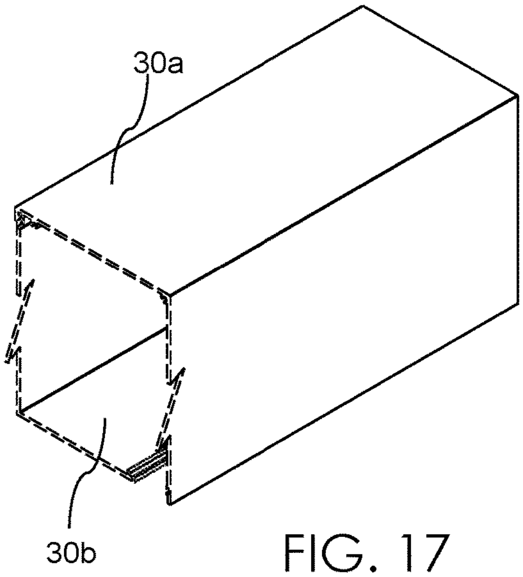
FIG. 17 is a perspective view of the adjustable screen hood housing.
Figure 18:
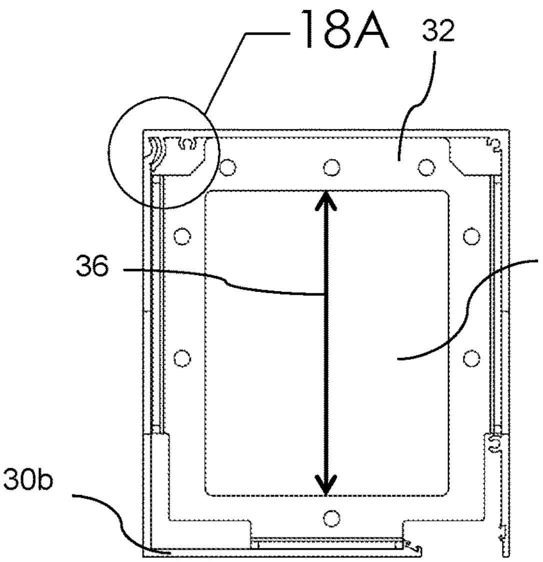
FIG. 18 is an enlarged front elevational view of the adjustable screen hood housing shown in FIG. 16.

In a non-limiting exemplary embodiment, as perhaps best shown in FIGS. 9 and 9B and 20, there are three pergola columns 26*a*, 26*b*, 26*c*. The center pergola column 26*b* has a longitudinal length 88 preferably 0.5 inches shorter than longitudinal length 87 of the left and right pergola columns 26*a*, 26*c*, respectively. The conventional pergola screen hood assembly 50 on the right does not employ the adjustable screen bracket 21 and, therefore, has screen hood assembly housing 51 that is not continuously abutted against an entire longitudinal length of the associated slope pergola beam 23*b*. As a result, an undesirable gap 29 gradually increases away from the center pergola column 26*b* wherein the gap 29 is most visible on the far right side, at the right pergola column 26*c*.

Still referring to FIGS. 9, 9A, and 20, conversely, the screen hood assembly 20 on the left uses the adjustable screen hood bracket 21. No gap exists at 85 below the sloped pergola roof beam 23*a* because the screen hood assembly housing 30 is sloped at the same angle as the pergola roof beam 23*a* (relative to the center pergola column 26*b*). Advantageously, the adjustable screen hood bracket 21 inside the screen hood assembly housing 30 allows the interior reel-mounting brackets 22 to horizontally level an associated screen reel 70 within the screen hood assembly housing 30 so the pergola screen works perfectly and looks great. Advantageously, even though the screen hood assembly housing 30 is sloped and oriented parallel to the sloped pergola roof beam 23*a* (thereby eliminating any gap), the axially opposed interior reel-mounting brackets 22 and associated reel 70 are horizontally aligned, along a horizontal axis 39, inside the sloped screen hood assembly housing 30.

Referring to FIGS. 1-20 in general, the adjustable screen hood assembly 20 includes a screen hood bracket 21 configured to horizontally align a reel-mounting bracket 22 within a non-horizontal screen hood assembly housing 30 that is parallel to a non-horizontal support beam 23 of a sloped roof structure 28, thereby eliminating a gap 29 between the non-horizontal screen hood assembly housing 30 and the non-horizontal support beam 23. The adjustable screen hood assembly 20 includes a screen hood housing 30 configured to be statically affixed to an underside of an existing sloped beam 23 of a sloped roof structure 28, at least one reel-mounting bracket 22 having a first vertical length 33 and being disposed within the screen hood housing 30, at least one screen hood bracket 21 removably affixed to an associated end of the screen hood housing 30 wherein the at least one screen hood bracket 21 has a central aperture 35 provided with a second vertical length 36 greater than the first vertical length 33, and an optional gasket 37 disposed within the screen hood housing 30 and being engaged with the at least one screen hood bracket 21. Advantageously, the at least one reel-mounting bracket 22 is adjustably positioned within a perimeter 35*a* of the central aperture 35 and selectively displaced along a bi-directional vertical travel path 86 registered orthogonal (or substantially orthogonal) to a longitudinal length 67 of the screen hood housing 30. Advantageously, the screen hood housing 30 has a central longitudinal axis 38 angularly offset relative to horizontal axis 39. Advantageously, the screen hood housing 30 is configured to be continuously abutted against the existing sloped beam 23 and oriented parallel thereto such that no gap exists at 85, which is an abutment between the underside of the existing sloped beam 23 and the topside of screen hood housing 30. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the at least one screen hood bracket 21 includes a central portion 40 surrounding the central aperture 35 and having a single and continuous layer 45 provided with a planar posterior face 46 and a planar anterior face 47 opposed therefrom. Two axially opposed screen hood brackets 21 are located at axially opposed ends, respectively, of screen hood housing 30 and support the screen reel 70 therebetween along the horizontal axis 39. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the at least one screen hood bracket 21 further includes a plurality of flanges 48 integral and monolithic with the single and continuous layer 45. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the flanges 48 include a first flange 48*a* being extended upwardly from a top edge of the single and continuous layer 45 and being planar thereto. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the flanges 48 further include a second flange 48*b* being extended forwardly from a bottom edge of the anterior face 47 and further being registered orthogonal thereto. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the flanges 48 further include a third flange 48*c* being extended forwardly from a left edge of the anterior face 47 and further being registered orthogonal thereto. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the flanges 48 further include a fourth flange 48*d* being extended forwardly from a right edge of the anterior face 47 and further being registered orthogonal thereto. In this manner, the third flange 48*c* is oriented parallel to the fourth flange 48*d* and may abut against the interior walls of the screen hood assembly housing 30. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, the bi-directional travel path 86 is shorter than the first vertical length 33 of the central aperture 35 and oriented parallel to a vertical axis 49. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

In a non-limiting exemplary embodiment, at least one edge 22*a* of the reel-mounting bracket 22 is spaced from the interior perimeter 35*a* of the central aperture 35. Such a structural configuration yields the new, useful, and unpredicted result of significantly reducing (and preferably eliminating) a gap 29 between a screen hood assembly housing 30 and a sloped beam 23 of a sloped roof structure 28 while enabling the screen reel 70 to operate in a proper horizontal (level) manner.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. An adjustable screen hood assembly for reducing a gap along a sloped roof structure, said adjustable screen hood assembly comprising:

- a screen hood housing configured to be affixed to an underside of an existing sloped beam of a sloped roof;
- at least one reel-mounting bracket having a first vertical length and being disposed within said screen hood housing; and
- at least one screen hood bracket affixed to said screen hood housing, said at least one screen hood bracket having a central aperture provided with a second vertical length greater than said first vertical length;
- wherein said at least one reel-mounting bracket is adjustably positioned within a perimeter of said central aperture and selectively displaced along a travel path;
- wherein said screen hood housing has a central longitudinal axis angularly offset relative to a horizontal axis;
- wherein said screen hood housing is configured to be continuously abutted against the existing sloped beam and oriented parallel thereto such that no gap exists between the underside of the existing sloped beam and said screen hood housing.

2. The adjustable screen hood assembly of claim 1, wherein said at least one screen hood bracket comprises: a central portion surrounding said central aperture and having a single and continuous layer provided with a planar posterior face and a planar anterior face opposed therefrom.

3. The adjustable screen hood assembly of claim 2, wherein said at least one screen hood bracket further comprises: a plurality of flanges integral and monolithic with said single and continuous layer.

4. The adjustable screen hood assembly of claim 3, wherein said flanges comprise: a first flange being extended upwardly from a top edge of said single and continuous layer and being planar thereto.

5. The adjustable screen hood assembly of claim 4, wherein said flanges further comprise: a second flange being extended forwardly from a bottom edge of said anterior face and further being registered orthogonal thereto.

6. The adjustable screen hood assembly of claim 5, wherein said flanges further comprise: a third flange being extended forwardly from a left edge of said anterior face and further being registered orthogonal thereto.

7. The adjustable screen hood assembly of claim 6, wherein said flanges further comprise: a fourth flange being extended forwardly from a right edge of said anterior face and further being registered orthogonal thereto.

8. The adjustable screen hood assembly of claim 7, wherein said third flange is oriented parallel to said fourth flange.

9. The adjustable screen hood assembly of claim 1, wherein said travel path is shorter than said first vertical length of said central aperture and oriented parallel to a vertical axis.

10. The adjustable screen hood assembly of claim 1, wherein at least one edge of said reel-mounting bracket is spaced from said perimeter of said central aperture.

11. An adjustable screen hood assembly for reducing a gap along a sloped roof structure, said adjustable screen hood assembly comprising:

a screen hood housing configured to be statically affixed to an underside of an existing sloped beam of a sloped roof;

at least one reel-mounting bracket having a first vertical length and being disposed within said screen hood housing; and at least one screen hood bracket statically affixed to an associated end of said screen hood housing, said at least one screen hood bracket having a central aperture provided with a second vertical length greater than said first vertical length;

wherein said at least one reel-mounting bracket is adjustably positioned within a perimeter of said central aperture and selectively displaced along a vertical travel path registered substantially orthogonal to a longitudinal length of said screen hood housing;

wherein said screen hood housing has a central longitudinal axis angularly offset relative to a horizontal axis;

wherein said screen hood housing is configured to be continuously abutted against the existing sloped beam and oriented parallel thereto such that no gap exists between the underside of the existing sloped beam and said screen hood housing.

12. The adjustable screen hood assembly of claim 11, wherein said at least one screen hood bracket comprises: a central portion surrounding said central aperture and having a single and continuous layer provided with a planar posterior face and a planar anterior face opposed therefrom.

13. The adjustable screen hood assembly of claim 12, wherein said at least one screen hood bracket further comprises: a plurality of flanges integral and monolithic with said single and continuous layer.

14. The adjustable screen hood assembly of claim 13, wherein said flanges comprise: a first flange being extended upwardly from a top edge of said single and continuous layer and being planar thereto.

15. The adjustable screen hood assembly of claim 14, wherein said flanges further comprise: a second flange being extended forwardly from a bottom edge of said anterior face and further being registered orthogonal thereto.

16. The adjustable screen hood assembly of claim 15, wherein said flanges further comprise: a third flange being extended forwardly from a left edge of said anterior face and further being registered orthogonal thereto.

17. The adjustable screen hood assembly of claim 16, wherein said flanges further comprise: a fourth flange being extended forwardly from a right edge of said anterior face and further being registered orthogonal thereto; wherein said third flange is oriented parallel to said fourth flange.

18. The adjustable screen hood assembly of claim 11, wherein said travel path is shorter than said first vertical length of said central aperture and oriented parallel to a vertical axis.

19. The adjustable screen hood assembly of claim 11, wherein at least one edge of said reel-mounting bracket is spaced from said perimeter of said central aperture.

20. An adjustable screen hood assembly for reducing a gap along a sloped roof structure, said adjustable screen hood assembly comprising:

a screen hood housing configured to be statically affixed to an underside of an existing sloped beam of a sloped roof;

at least one reel-mounting bracket having a first vertical length and being disposed within said screen hood housing;

at least one screen hood bracket removably affixed to an associated end of said screen hood housing, said at least one screen hood bracket having a central aperture provided with a second vertical length greater than said first vertical length; and wherein said at least one reel-mounting bracket is adjustably positioned within a perimeter of said central aperture and selectively displaced along a bi-directional vertical travel path registered substantially orthogonal to a longitudinal length of said screen hood housing;

wherein said screen hood housing has a central longitudinal axis angularly offset relative to a horizontal axis;

wherein said screen hood housing is configured to be continuously abutted against the existing sloped beam and oriented parallel thereto such that no gap exists between the underside of the existing sloped beam and said screen hood housing.

* * * * *